United States Patent
Kelly et al.

(10) Patent No.: US 6,952,521 B2
(45) Date of Patent: Oct. 4, 2005

(54) METHODS AND APPARATUS FOR EDITING DIGITAL VIDEO RECORDINGS, AND RECORDINGS MADE BY SUCH METHODS

(75) Inventors: Declan P. Kelly, Eindhoven (NL); Pieter B. Ijdens, Eindhoven (NL); Octavius J. Morris, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 924 days.

(21) Appl. No.: 09/817,104

(22) Filed: Mar. 26, 2001

(65) Prior Publication Data

US 2001/0036355 A1 Nov. 1, 2001

(30) Foreign Application Priority Data

Mar. 31, 2000 (GB) ............................................. 0007868

(51) Int. Cl.⁷ ............................ G11B 27/00; H04N 5/93
(52) U.S. Cl. ............................................. 386/52; 386/55
(58) Field of Search ............................ 386/52, 55, 57, 386/59, 65, 46, 125, 124, 92, 45, 40, 109, 111, 112, 22, 33, 4, 1, 113, 21; 360/13

(56) References Cited

U.S. PATENT DOCUMENTS

| | | |
|---|---|---|
| 5,696,557 A | 12/1997 | Yamashita et al. |
| 5,742,732 A | 4/1998 | Kubo et al. |
| 5,917,988 A | 6/1999 | Eto |
| 6,055,246 A * | 4/2000 | Jones ........................ 370/503 |
| 6,584,273 B1 * | 6/2003 | Ashley et al. ................. 386/52 |

FOREIGN PATENT DOCUMENTS

| | | | |
|---|---|---|---|
| EP | 0730376 | 9/1996 | |
| EP | 0837609 A2 | 4/1998 | ............ H04N/7/52 |
| EP | 0926903 | 12/1998 | |
| EP | 0923243 | 6/1999 | |
| EP | 0926678 | 6/1999 | |
| EP | 0944086 | 9/1999 | |
| EP | 1061745 A2 | 12/2000 | ............ H04N/7/24 |
| WO | WO9938094 | 9/1999 | |
| WO | WO0000981 | 1/2000 | |

OTHER PUBLICATIONS

C.H. Birch, "MPEG Splicing and Bandwidth Management", International Broadcasting Convention, London, GB, Sep. 1997, pp. 541–546, XP002084316.

* cited by examiner

*Primary Examiner*—Robert Chevalier
(74) *Attorney, Agent, or Firm*—Michael E. Belk (57) ABSTRACT

Various methods are disclosed for producing an edited MPEG audio/video stream from first and second streams recorded in a transport-stream format normally intended for broadcast purposes. According to one implementation, a bridge sequence is generated which recodes data from both of the original streams, in the region of the edit point. Padding packets are inserted in the elementary streams to adjust a continuity counter values so as to allow continuous decoding across the join between bridge sequence and second sequence proper. In another implementation, seamless playback is not required, the bridge sequence is omitted, and various process are implemented "on-the-fly" to generate an edited stream compliant with MPEG-2 specification. To this end, exit and entry points are constrained to certain types of coded pictures, and offset between time-bases is adjusted to avoid buffer overflow.

39 Claims, 4 Drawing Sheets

METHODS AND APPARATUS FOR EDITING DIGITAL VIDEO RECORDINGS, AND RECORDINGS MADE BY SUCH METHODS

The present invention relates to methods and apparatuses for the editing and subsequent playback of edited audio/video data, and to edited recordings made by such methods and apparatuses. The invention finds particular application for example in the smooth playback of edited audio/video data streams in a transport stream format in compliance with the MPEG-2 specification (ITU_T recommendation H.222.0|ISO/IEC 13818-1). Compliance with that specification is not essential to the invention, however.

The MPEG-2 specification mentioned above specifies generic methods for multimedia multiplexing, synchronisation and time-base recovery for use in transmitting, recording and reproducing digital video (including audio) programmes. The specifications provide a packet based multimedia multiplexing where each elementary bit stream (video, audio, other data) is segmented into a Packetised Elementary Stream (PES), and then respective packets are multiplexed into either of two distinct stream types. Program Stream (PS) is a multiplex of variable length PES packets and designed for use in error free environments, such as recording on disc. Transport Stream (TS) consists of 188 byte fixed length packets, has functionality of multiple programme multiplexing as well as multiplexing of various PES packets of one programme, and is designed for use in error-prone environments such as broadcast. Whereas the PES packets in Program Stream format can be transmitted whole and uninterrupted, in TS the PES packets for video and audio, are subdivided and multiplexed with one another in the smaller TS packets. The multimedia synchronisation and time-base recovery are achieved by time-stamps for system time clock and presentation/decoding.

One known system for the distribution of video programmes is the Digital Versatile Disc (DVD). This standard defines a specific form of MPEG-2 Program Stream for storage of motion pictures and related material on optical disc. While DVD provides presently for the distribution of pre-recorded material, there is clearly a demand for both commercial and domestic audio and/or video (A/V) equipment capable of recording digital A/V data from broadcasts and home-recorded material, just as the popular video cassette tape systems currently in use permit recording of analogue A/N material. One enhancement expected for digital video recording systems is to permit seamless editing and smooth playback of A/V data. Applications include commercial or home video editing and interactive video where multiple branch points in playback are possible. A particular advantage of modern disc-based storage media is their "random access" nature, compared with the "linear" nature of tape media. Thus, edited programmes can be stored and changed without copying the original streams. In principle, only limited additional information needs to be stored, defining the playback sequence. This is then used to control access to the different parts of the disc at the time of playback, to synthesise the edited programme. The edited programme may even be interactively determined, according to user input.

While attractive in principle, the skilled person will recognise many problems in the practical recording and editing of digital video streams using a single decoder. As is well known to the skilled reader, the original recordings must be generated and stored in compliance with many different and inter-related constraints, which are specified to ensure playback is possible on any compliant decoder. In general, these constraints will be violated if one simply switches playback from the middle of one original stream to another at a desired edit point. The most direct approach to editing such streams is to decode the two streams independently around the edit point, and switch between them at the desired edit point. Examples of such techniques are disclosed in U.S. Pat. No. 5,696,557 and EP-A-0923243. This effectively requires the expense of a second decoder, however, and the consumer would prefer to avoid this expense. Further problems remain.

As one example, although disc-based recording systems are generally regarded as "random access" in nature, when compared with tapes, the "seek time" involved in switching between different storage locations on the disc or other medium inevitably interrupts the flow of real-time data, and disc allocation rules are imposed in practical systems, to prevent too many seeks occurring and leaving the decoder short of real-time data. According to European Patent Application EP-A-0983591 (PHN 16815 EP), a "bridge sequence" can be generated and stored separately on the same disc to link two A/V segments which ensures that two segments otherwise could not be joined without violating the allocation rules.

Editing may in principle be desired for connecting two MPEG streams at frame boundaries, between a first group of pictures (GOP) and second group of pictures, or at arbitrary frame points. However, because of the nature of MPEG coding and decoding there arise a number of potential problems, due to such factors as temporal dependencies between frames and buffering constraints. For example, the video signal may not be decodable. This is due to the fact that MPEG-2 codes video frames with reference to other video frames, and if a reference frame is missing then dependent frames will not be decodable. An MPEG stream comprises: independent or Intra-coded (I) frames, which are self contained and used as reference points; Predictive-coded (P) frames, which may also be used for reference; and Bi-directionally predictive-coded (B) frames, coded using prediction from past and/or future reference frames.

WO-A-00/00981 (PHB34262 WO) commonly assigned herewith applies further the concept of bridge sequences to re-code frames and re-multiplex audio and video from the two streams in the bridge sequence. This bridge sequence links together two streams while maintaining coding compliance, enabling frame-accurate edits to be implemented, with smooth playback via the standard decoder.

The present application discloses among other things further improvements and adaptations to such a scheme. The above prior art assumes that recordings are based on the Program Stream format of MPEG-2. There is newly a desire for an alternative domestic digital video recording format based on MPEG Transport Stream (TS). Aspects of one such recording format are disclosed in our co-pending United Kingdom patent application 0007870.9 entitled "Methods and Apparatus for Making and Replaying Digital Video Recordings, and Recordings Made by Such Methods" (PHGB 000041). Editing and playback of recordings in TS format therefore poses several problems additional to those present in the PS format.

Summarising the problems to be addressed, decoding using incorrect reference frames will lead to visual artefacts. Re-ordering of video frames in the TS can result in video frames in the edited stream which should not be displayed. Audio will be similarly affected by the editing process. Since the audio signal is not aligned with the video, joining two streams will result in partial audio frames around the edit point, resulting in audio artefacts. Buffer problems will arise when the combined stream does not conform to MPEG buffer model requirements which can result in data loss at the decoder. Audio skew can occur as the audio frames that are presented with video frame are not aligned in the multiplex stream, generally arriving up to one second before or after the corresponding video in the multiplex. Discontinuities will arise in the time-base used for (the PCR/PTS/DTS) timestamps. Additionally, the Continuity Counter in the TS packets will be discontinuous at the edit point.

The inventors envisage providing for two different forms of editing. These are (i) simple edits where the streams are joined at group of pictures (GOP) boundaries, in non-seamless fashion, and (ii) complex edits where streams can be joined frame-accurately and seamlessly, regardless of GOP boundaries. Each form of edit requires careful processing to avoid the type of problems detailed above. The MPEG specification provides for "splice points" to be signalled in Transport Streams, both of seamless and non-seamless type. However, use of these editing points is only possible to the extent that the programme provider has included such signalling in the stream, and predefined splice points cannot support the option of frame-accurate editing at the user's choice of frame.

U.S. Pat. No. 5,917,988 (Sony Corp.) proposes an apparatus and method to prevent the output of defective pictures when streams are joined together across groups of pictures (GOP's). The scheme presented repeats one of the reference pictures used for decoding to give a pause in playback rather than a bad picture. The method disclosed does not produce smooth, frame accurate editing and playback and does not take into account buffer discontinuity or multiplex continuity issues.

Another proposal for stream editing in professional applications is EP 0 926 678 A2 (Tektronix). Frame references are synthesised with input sequences around the edit point, decoded, and re-encoded using only I-pictures using ancillary storage in the editing equipment. This approach will produce seamless editing but does not address problems arising from address, multiplex, or audio issues. Furthermore, the requirement for fast ancillary storage does not provide an edit stored on the optical disc itself, suitable for use in consumer equipment. It goes without saying that a bridge sequence comprising only a succession of I-pictures requires too high a data rate to be accepted within the bit-rate constraints of typical disc storage devices.

It is an object of this invention to provide a variety of methods and apparatus for the smooth playback of edited coded data streams such as MPEG-2 TS. It will be understood that the invention is applicable beyond the strict confines of MPEG-2 compliant streams, as similar problems will generally arise when playing and editing any coded multiplexed streams.

The inventors have recognised that different forms of editing the data streams are possible and that any proposed method must take this and other constraints inherent in the coding format into account to ensure smooth playback of edited streams, particularly via a digital interface to an external decoder. Issues associated with MPEG transport stream multiplex format are addressed, reducing audio and video disturbance to the user.

In accordance with a first aspect of the present invention there is provided a data processing apparatus comprising means operable to read sequences of frame-based data from a storage device and to edit the same such that a first edit point in a first frame sequence is linked to a second edit point in a second sequence without violating constraints imposed by a predefined decoder, wherein each of the stored frame sequences comprises at least one series of transport packets, the transport packets of a given series including respective continuity counter values each related by predetermined continuity rules to the preceding one, the apparatus comprising means for calculating the magnitude of a discontinuity in continuity counter values resulting from the linking of said edit points, and means for generating a corresponding number of additional transport packets, each having its own continuity counter value, so as to define an edited sequence of transport packets linking said first and second edit points while complying with said constraints and continuity rules.

In an embodiment wherein said first and second sequences convey at least one packetised elementary stream whose packets have themselves been subdivided to form said transport packets, the apparatus may be further adapted to identify a transport packet whose payload includes a packet boundary, and to generate said additional packet(s) so as to comply with said continuity rules when inserted before the identified packet.

The apparatus may comprise means for outputting said edited sequence of transport packets, including said additional packets, via a digital interface.

The first and second sequences and the edited sequence may for example be compliant with the MPEG-2 specification as defined herein.

The first and second sequences of frame-based data may each comprise a multiplex of packetised elementary streams, each elementary stream having its own sequence of transport packets. The continuity rules may operate independently for each elementary stream, the apparatus being adapted to generate additional transport packets for each elementary stream in accordance with the magnitude of discontinuity calculated for that stream individually.

The apparatus may comprise means for generating and storing additional data defining the edit, so as to permit subsequent reproduction of the sequences edited together. Said additional transport packets may be generated and stored as part of said additional data. Alternatively, the apparatus may be adapted not to generate said additional packets until reproduction of the edited sequence.

In an embodiment wherein said first and second sequences comprise frame-based data including a number of frames which are intra-coded without reference to any other frame of the sequence, and a number of frames which are inter-coded with reference to at least one further frame of the sequence, the apparatus may include bridge generation means configured to create a bridge sequence of transport packets to link the first and second sequences around said edit points, by selective incorporation of frames from the stored first and second frame sequences and selective recoding of one or more of the frames within the bridge sequence as determined by the coding type (intra- or inter-) of the frames from the first and second sequences indicated by the respective edit points.

In such an embodiment, the additional transport packets may be included in the generated bridge sequence.

Said continuity rules may permit a discontinuity in the edited sequence, at a location followed immediately by certain classes of frame header, in which case the apparatus may be adapted to include such a discontinuity in the bridge sequence, while inserting said additional packets so as to ensure compliance with the continuity rules elsewhere. Such an embodiment may require fewer packets to be modified in order to comply with the continuity rules.

The apparatus may comprise means for storing the bridge sequence on a record carrier together with said first and second sequences and playlist information. In such an embodiment, the additional transport packets may be included in the stored bridge sequence, or alternatively may be generated during reproduction by the apparatus.

Further in accordance with the first aspect of the present invention there is provided a method of reading sequences of frame-based data from a storage device and editing the same such that without violating constraints imposed by a predefined decoder, wherein each of the stored frame sequences comprises at least one series of transport packets, the transport packets of a given series including respective continuity counter values each related by a predetermined continuity rules to the preceding one, the method comprising calculating the magnitude of a discontinuity in continuity counter values resulting from the linking of said edit points, and generating a corresponding number of additional transport packets, each having its own continuity counter value, so as to define an edited sequence of transport packets linking said first and second edit points while complying with said constraints and continuity rules.

Yet further in accordance with the first aspect of the present invention there is provided a storage device carrying first and second frame sequences together with one or more bridge sequences linking a first edit point in a first frame sequence is linked to a second edit point in a second frame sequence.

In a second aspect, the invention provides a data reproducing apparatus comprising reproducing means operable in response to stored edit data to read from a storage device first and second sequences of data, the edit data linking a first edit point in the first sequence to a second edit point in a second sequence so as to output a desired edited sequence, wherein said first and second sequences each comprise at least two multiplexed elementary streams encoded and multiplexed in a form compliant with a predefined decoder specification such that truncating said first sequence at said first edit point and entering said second sequence at said second edit point would potentially violate one or more constraints within said decoder specification, said reproducing means operating substantially without recoding or re-multiplexing of said elementary streams by reproducing data selectively from said first and second sequences in the vicinity of said edit points, such that said edited sequence, as output, complies with said decoder specification.

The invention in its second aspect further provides a method of reproducing stored data, wherein first and second sequences of data stored are read from a storage device and reproduced, in accordance with pre-stored edit data linking a first edit point in the first sequence to a second edit point in a second sequence, so as to output a desired edited sequence, wherein said first and second sequences each comprise at least two multiplexed elementary streams encoded and multiplexed in a form compliant with a predefined decoder specification such that truncating said first sequence at said first edit point and entering said second sequence at said second edit point would in general violate one or more constraints within said decoder specification, said reproducing means operating substantially without recoding or re-multiplexing of said elementary streams by reproducing data selectively from said first and second sequences in the vicinity of said edit points, such that said edited sequence, as output, complies with said decoder specification.

The invention in its second aspect yet further provides a signal reproducing an edited data sequence, produced by a method according to the invention as set forth above.

Further features of the present invention are recited in the attached claims, the disclosure of which is incorporated herein by reference, and to which the reader's attention is now directed. Further, independent aspects of the invention will be apparent from the following disclosure. These are further described in terms of exemplary, but non-limiting, embodiments below.

Embodiments of the invention will now be described, by way of example only, with reference to the accompanying drawings in which.

DIGITAL VIDEO RECORDING—GENERAL

The following description considers in particular A/V devices operating according to the MPEG standards (ISO/IEC 11172 for MPEG1 and, in particular, ISO/IEC 13818 for MPEG2) although the skilled practitioner will recognise the applicability of the present invention to other A/V coding schemes not in conformance with the MPEG standard.

The following describes how the present invention addresses the problem of making video- and/or audio-frame accurate edits in an MPEG Transport Stream where, because of the temporal dependencies and buffering models used in MPEG coding and multiplexing, simple cut-and-paste edits cannot be made at just any frame boundary.

In order to facilitate editing without dual decoding during playback, bridge sequences are generated, which are short sequences of MPEG data that are especially constructed (in a manner to be described) to link together two original recordings of MPEG data. This has been described in principle for the editing of Program Stream format, in WO-A-00/00981 (PHB34262 WO), mentioned above. Reference is made to that publication for further background. As is known from that document, it becomes necessary in general to partially decode and re-encode sections of this data in order to construct a valid MPEG stream.

The final element in the video edit is a control structure or play list. This instructs the play-back system how to sequence through the streams. It specifies the out-point from the original stream and information about the start of the bridge sequence. It specifies where to jump into the second stream from the end of the bridge sequence. It may also contain other information to make management of the play back easier.

Figure 1:
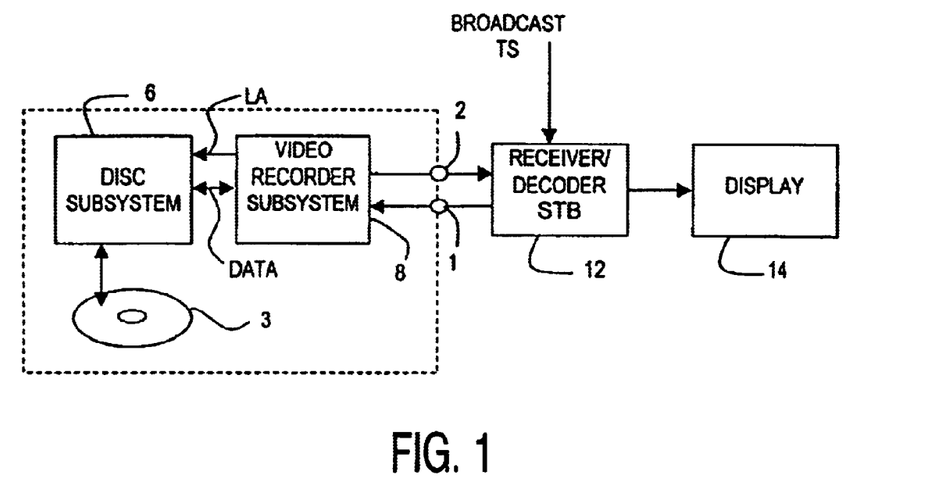
FIG. 1 is a block schematic representation of an A/V installation including an optical disc record/replay apparatus suitable to embody the invention.

FIG. 1 shows within the dashed box an embodiment of an apparatus suitable to host the present invention, in the form of an optical disc record and playback device. In the description of the apparatus, the handling of frame-based video signals is concentrated upon, although it will be recognised that other types of signal may alternately or additionally be processed, such as audio or data signals, and that the invention is equally applicable to other memory devices such as magnetic data storage means and computer hard disc drives.

The apparatus comprises an input terminal 1 for receiving a video signal to be recorded on optical disc 3. Further, the apparatus comprises an output terminal 2 for supplying a video signal reproduced from the disc. These terminals may in use be connected via a digital interface such as IEEE 1394 to a digital TV receiver and decoder 12 in the form of a "set-top box", which also receives broadcast signals from satellite, cable or the like, in MPEG TS format. The decoder provides display signals to a display device 14, which may be a conventional analogue TV set.

The data area of the disc 3 consists of a contiguous range of physical sectors, having corresponding sector addresses. This address space is divided into sequence areas, with a sequence area being a contiguous sequence of sectors. The video recording apparatus as shown in FIG. 1 is decomposed into two major system parts, namely the disc subsystem 6 and what is referred to herein as the video recorder subsystem 8, controlling both recording and playback. The two subsystems are characterised by a number of features, as will be readily understood, including that the disc subsystem can be addressed transparently in terms of logical addresses (LA) and can guarantee a maximum sustainable bit-rate for reading and/or writing data from/to the disc.

Figure 2:
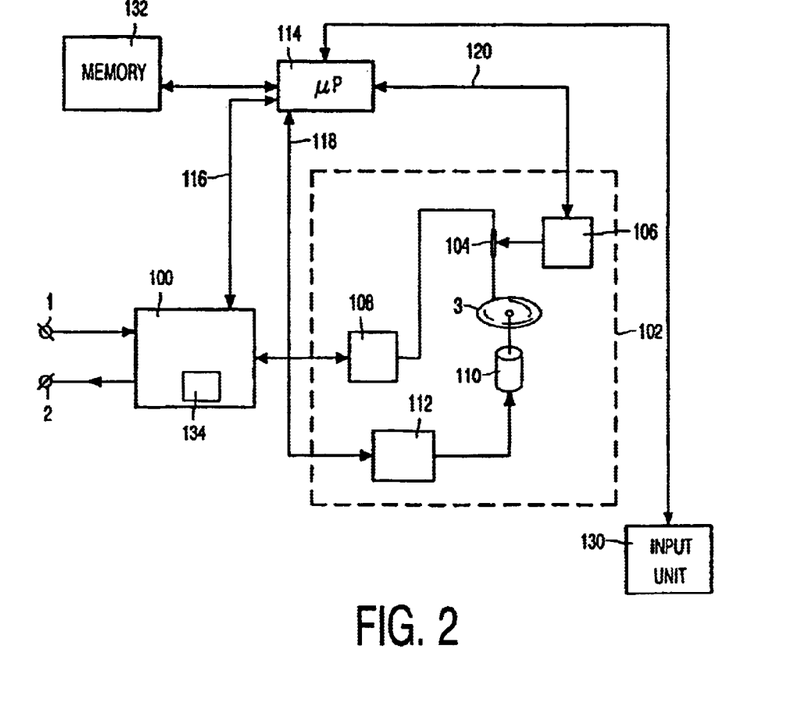
FIG. 2 is a more detailed schematic showing components within the apparatus of FIG. 1.

FIG. 2 shows a schematic version of the apparatus in more detail. The apparatus comprises a signal processing unit 100 which is incorporated in the subsystem 8 of FIG. 1. The signal processing unit 100 receives the video signal via the digital input terminal 1 and processes the video data into a channel signal for recording on the disc 3. A read/write unit indicated by dashed line 102 is provided, incorporated in the disc subsystem 6 of FIG. 1. The read/write unit 102 comprises a read/write head 104 configured for reading from/writing to optical disc 3. Positioning means 106 are present for positioning the head 104 in a radial direction across the disc 3. A read/write amplifier 108 is present in order to amplify the signals to and from the disc 3. A motor 110 rotates the disc 3 in response to a motor control signal supplied by signal generation unit 112. A microprocessor 114 is present for controlling all the circuits via control lines 116, 118, and 120.

The signal processing unit 100 is adapted to convert the video data received via the input terminal 1 into blocks of information in the channel signal: the size of the blocks of information can be variable but may (for example) be between 2 MB and 4 MB. The write unit 102 is adapted to write a block of information of the channel signal in a sequence area on the disc 3. The information blocks corresponding to the original video signal are written into many sequence areas that are not necessarily contiguous, as may be seen in the recording diagram of FIG. 3, which arrangement is known as fragmented recording. It is a characteristic of the disc sub-system that it is able to record and write such fragmented recordings fast enough to meet real-time deadlines, provided that certain allocation rules are met when the recordings are made.

In order to enable editing of the video data recorded in an earlier recording step on the disc 3, the apparatus is further provided with an input unit 130 for receiving an exit position (out-point) in a first video signal recorded on the disc 3 and for receiving an entry position (in-point) in a second video signal recorded on that same disc. Additionally, the apparatus comprises a bridging sequence generating unit 134, incorporated in the signal processing unit 100, for generating the bridging sequence to link the two video streams as is described in detail hereinafter.

Figure 3:
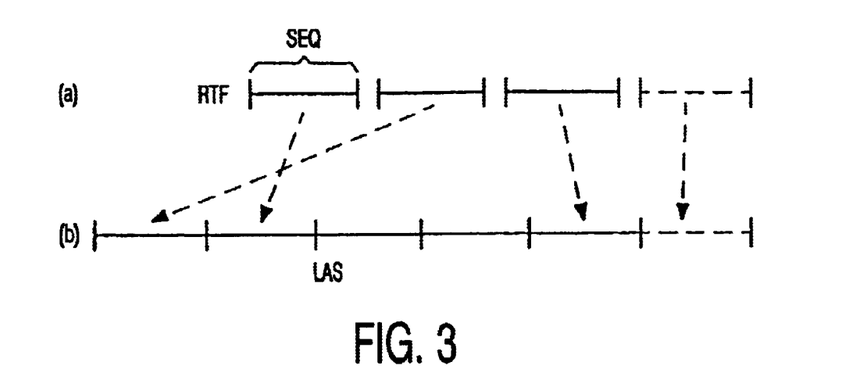
FIG. 3 represents the recording of blocks of information in sequence areas on an optical disc.

FIG. 3 illustrates recording of a video signal. In the video recorder subsystem 8, the video signal, which is a real time signal, is converted into a real-time file RTF as shown in the upper part of FIG. 3. The real-time file consists of a succession of signal block sequences SEQ for recording in corresponding (although fragmented) sequence areas. There is no constraint on the location of the sequence areas on the disc and, hence, any two consecutive sequence areas comprising portions of data of the video signal recorded may be anywhere in the logical address space LAS as shown in the lower part of FIG. 3. Within each sequence area, real time data is allocated contiguously. Each real time file represents a single A/N stream. The data of the A/V stream is obtained by concatenating the sequence data in the order of the file sequence.

Figure 4:
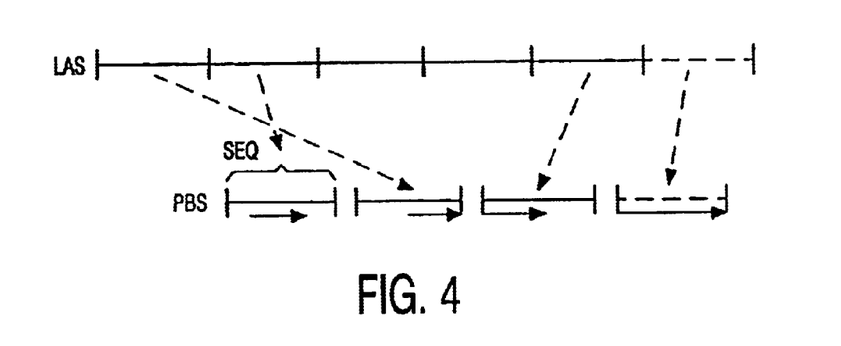
FIG. 4 represents the playback of information stored on the disc in FIG. 3.

FIG. 4 illustrates playback of a video signal recorded on the disc 3. Playback of a video signal is controlled by means of a playback control (PBC) program stored elsewhere in the logical address space. In general, each PBC program defines a new playback sequence PBS, which may comprise an edited version of recorded video and/or audio segments, and may specify a sequence of segments from respective sequence areas. Pointers to the logical addresses of the individual sequences making up the desired sequence are directly or indirectly included in the PBC. As may be seen from comparison of FIGS. 3 and 4, the PBC required to recreate the original file sequence (from FIG. 3) re-orders the fragmented recorded segments to provide a playback frame succession corresponding to the original sequence.

EDITING DIGITAL VIDEO RECORDING—GENERAL

Figure 5:
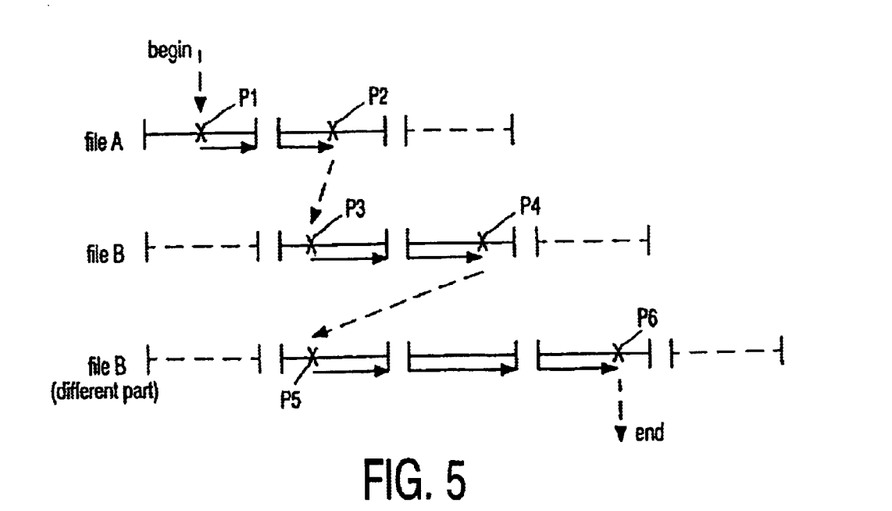
FIG. 5 generally illustrates the editing of stored video data, with bridge sequences omitted.

FIG. 5 illustrates the editing of one or more video signals recorded on the disc 3, and shows two video signals indicated by two sequences of fragments named "file A" and "file B". For realising an edited version of one or more video signals recorded earlier, a new PBC program is generated for defining the A/N sequence obtained by concatenating parts from earlier A/N recordings in a new order. The parts may be from the same recording or from different recordings. In order to play back a PBC program, data from various parts of (one or more) real time files has to be delivered to a decoder. This implies a new data stream that is obtained by concatenating parts of the streams represented by each real-time file. In FIG. 5, this is illustrated for a PBC program that uses three parts, one from file A and two from file B.

FIG. 5 shows the edited version starts at a point P1 in the succession of areas of file A and continues until point P2 in the next sequence area of file A. Then reproduction jumps over to the point P3 in the sequence area in file B and continues until point P4 in a further sequence area in file B. Next reproduction jumps over to the point P5 in the same file B, which may be a point earlier in the succession of sequence areas of file B than the point P3, or a point later in the succession than the point P4. From the point P5 in the sequence area in file B reproduction continues until point P6. The generation of bridge sequences for the transitions P2–P3 and P4–P5 has been omitted from FIG. 5 for reasons of clarity: the reasons for, and means for generation of, these bridge sequences will now be considered.

As will be generally understood, the following examples relate to frame-based rather than field-based editing.

Although editing could be performed to the exact field level, MPEG tends to treat fields in pairs, and extra processing effort would be required to accommodate an edit point between the fields of a frame. The demand for such a facility is not believed to merit the additional complexity in implementation. It will be recognised by the skilled person that MPEG compliance is not mandatory (as mentioned above) and that the techniques described herein may be also applied to non-MPEG field-based data.

Two types of editing can be considered in streams having inter-coded pictures interleaved with intra-coded pictures. Firstly, simple edits can be done where the streams are joined at video frame boundaries but nothing is done to ensure that the combined stream can be played back smoothly. It is assumed in this case that playback jumps to the beginning of a new group of pictures (GOP) or other suitable entry point, so that frame-accurate editing is not strictly achievable. Similarly, the exit point from the first sequence may be restricted. The user and even the system may specify the exit and entry points to frame precision, but the playback system implements the closest approximation, given the constraints of the picture coding types and possibly other factors.

Figure 6:
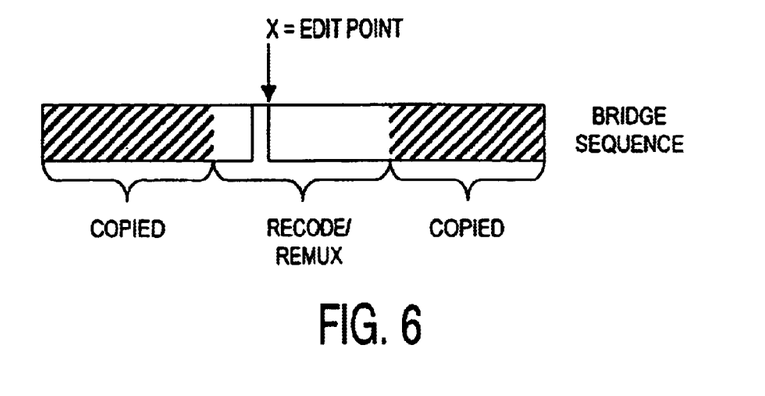
FIG. 6 shows the format of a bridge sequence recorded as part of an editing procedure.

Secondly, more complex editing can be envisaged, where a bridge sequence is created to handle the inconsistencies between the two streams. FIG. 6 illustrates a bridge sequence that may be generated to encompass any of the edit points shown in FIG. 5. At the core of the bridge sequence, shown without hatching, is a sequence of data remultiplexed and recoded as necessary to ensure that the edited stream meets buffering and data dependency requirements. This permits free selection of the edit points, irrespective of coding type. Additional A/V data, shown hatched, is also copied into the bridge sequence from before and after the edit points, in order to meet the allocation requirements to ensure continuous playback from the disc subsystem 6. Our co-pending application WO-A-00/00981 (PHB 34262 WO), mentioned above describes basic principles of these techniques. However, particularly when editing recordings with a format based on MPEG Transport Stream (TS) and similar formats, several practical issues remain to be resolved in an efficient manner.

In both cases (simple & complex editing) it is assumed that the original streams remain unchanged on disk. Complex edits where a bridge sequence is created will normally be done on disc. Simple edits may be implemented in a tape-based system, where two streams are concatenated on tape at arbitrary video frame boundaries. Further detail of editing and playback procedures of the simple and complex types are described below. In the present embodiments, it is assumed that the streams are multiplexed in a Transport Stream (TS) type format, rather than the Program Stream format assumed in the prior art referred to above.

Transport Stream Format

Figure 7:
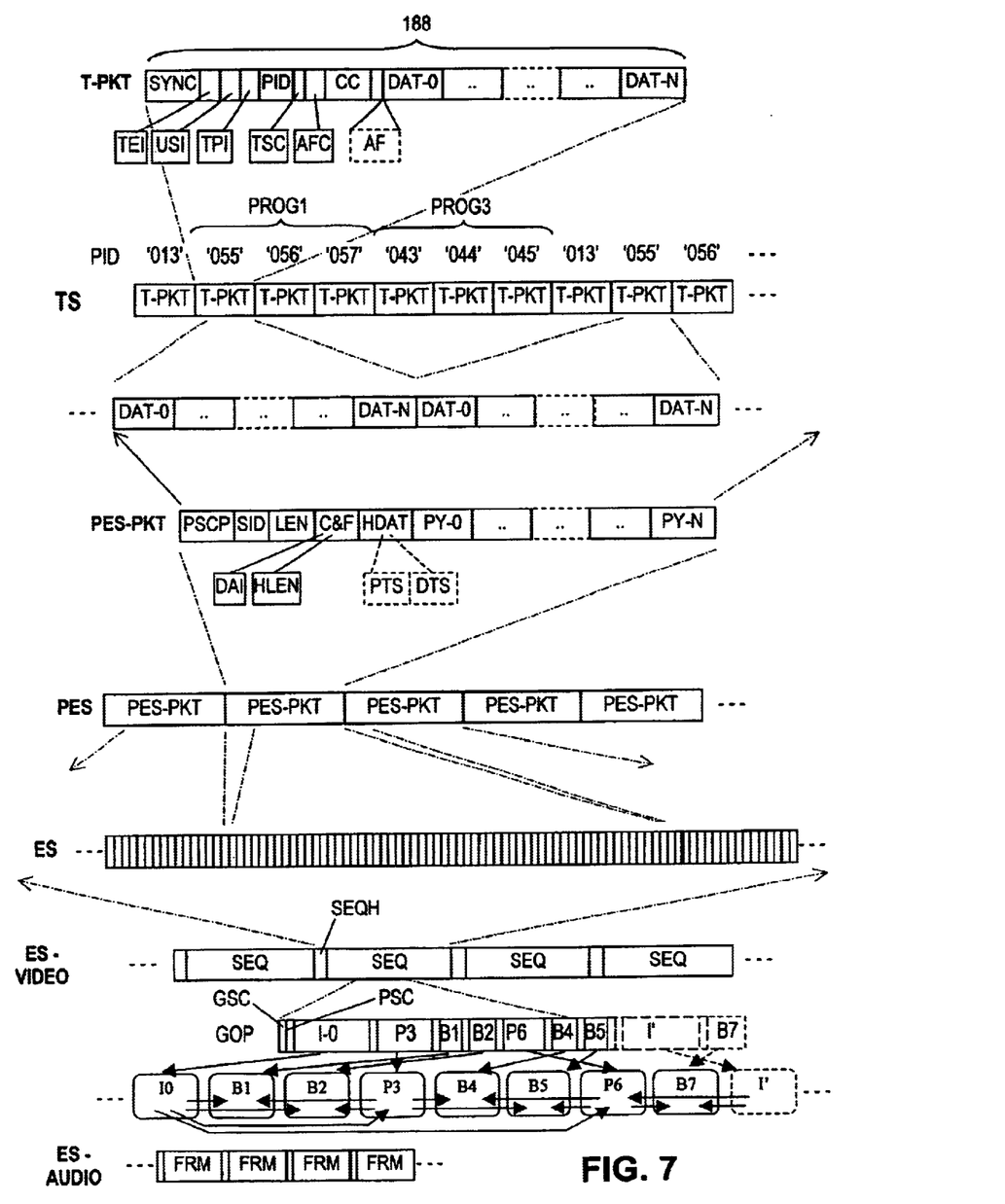
FIG. 7 illustrates the structure and key features of the MPEG Transport Stream (TS) format, which forms the basis of recordings made by the apparatus of FIG. 1.

FIG. 7 illustrates the key features and structure of the MPEG-2 Transport Stream (TS) format. In the system of FIG. 1, the data is be stored on disc 3 in a TS-based format, similar to that in which it is received off-air, and in which it is passed over the digital interfaces 1 and 2. The TS is a continuous stream of transport packets labelled T-PKT in the drawing, each comprising 188 bytes of data, and having the format shown at the top of FIG. 7. Full details of the MPEG-2 Transport Stream, including Syntax, semantics and constraints applicable, will be found in ITU-T recommendation H.262| ISO/IEC 13818-1. Information about the MPEG-2 system is available online at http://www.mpeg.org. Briefly, each transport packet includes a header portion and a payload portion, the payload being indicated as bytes DAT-0 to DAT-N in the figure. The header begins with a distinctive synchronisation byte sync followed by various flags and control fields including a transport error indicator TEI, a payload unit start indicator USI, a transport priority indicator TPI, a packet identification PID, transport scrambling control field TSC, adaptation field control AFC and continuity counter CC.

The continuity counter CC is a 4-bit field incrementing with each Transport Stream packet for a given PID. CC wraps around to 0 after its maximum value. CC is not incremented when the adaptation field control of the packet indicates no payload for the packet. Continuity counter is a feature of the Transport Stream, not the Program Stream format, which is designed to allow devices to detect loss of packets in an error-prone channel. Packets following a lost packet generally have to be discarded until new synchronisation with new headers can be obtained. This makes editing TS streams more difficult however: the decoder has to be able to distinguish between discontinuities deliberately introduced by editing, and those introduced by transmission errors.

Depending on the contents of field AFC, there may be present an adaptation field AF, occupying some of the space otherwise allocated to payload data. The adaptation field AF may for example contain a discontinuity indicator flag as defined in ISO/IEC 13818 for MPEG2. When set to '1', this flag indicates that the discontinuity state is true for the current Transport Stream packet. The discontinuity indicator is used to indicate two types of discontinuities, system time-base discontinuities and continuity counter discontinuities. In addition to optional data fields of pre-defined meaning, the adaptation field can be padded with stuffing bytes, so as to match the PES packet ends to TS packet boundaries.

A system time-base discontinuity is indicated by the use of the discontinuity indicator in Transport Stream packets of a PID designated as carrying a system time-base in the form of program clock reference PCR (refer to ISO/IEC 13818-2 Section 2.4.4.9). Quoting from that specification, when the discontinuity state is true for a Transport Stream packet of a PID designated as a PCR_PID, the next PCR in a Transport Stream packet with that same PID represents a sample of a new system time clock for the associated program. The discontinuity indicator shall be set to '1' in the packet in which the system time-base discontinuity occurs. The discontinuity indicator bit may also be set to '1' in Transport Stream packets of the same PCR_PID prior to the packet which contains the new system time-base PCR. In this case, once the discontinuity indicator has been set to '1', it shall continue to be set to '1' in all Transport Stream packets of the same PCR_PID up to and including the Transport Stream packet which contains the first PCR of the new system time-base.

In contrast to discontinuities in the system time-base, once flagged by the discontinuity indicator, are expected in valid Transport Streams, and the decoder plays through these seamlessly. Discontinuities in Continuity Counter values, although signalled as "known about" by the discontinuity indicator, still cause the typical decoder to treat data as invalid until new sequence headers are found to re-synchronise the audio/video frame structure, and to confirm the decoding parameters.

Quoting from the MPEG specification again, a continuity counter discontinuity is indicated by the use of the discontinuity indicator in any Transport Stream packet. When the discontinuity state is true in any Transport Stream packet of a PID not designated as a PCR_PID, the continuity counter in that packet may be discontinuous with respect to the previous Transport Stream packet of the same PID. When the discontinuity state is true in a Transport Stream packet of a PID that is designated as a PCR_PID, the continuity counter may only be discontinuous in the packet in which a system time-base discontinuity occurs. A continuity counter discontinuity point occurs when the discontinuity state is true in a Transport Stream packet and the continuity counter in the same packet is discontinuous with respect to the previous Transport Stream packet of the same PID.

After a continuity counter discontinuity in a Transport packet which is designated as containing elementary stream data, the first byte of elementary stream data in a Transport Stream packet of the same PID shall be the first byte of an elementary stream access point. In the case of audio, such access point are the starts of a new audio frame. In the case of video, the first byte of a video sequence header, or else a sequence end code followed by an video sequence header, will serve as an access point. Each Transport Stream packet which contains elementary stream data with a PID not designated as a PCR_PID, and in which a continuity counter discontinuity point occurs, and in which a PTS or DTS occurs, shall arrive at the input of the T-STD after the system time-base discontinuity for the associated program occurs. In the case where the discontinuity state is true, if two consecutive Transport Stream packets of the same PID occur which have the same continuity counter value and have adaptation field control values set to '01' or '11', the second packet may be discarded. A valid Transport Stream shall not be constructed in such a way that discarding such a packet will cause the loss of PES packet payload data or PSI data.

In the example of the DVB digital broadcast format, the data rate of the TS Stream is around 40 (Mbits/s), while the typical data rate for an audio visual programme is less than 10 Mbits/s. Accordingly, as shown at TS in FIG. 7, various programmes PROG1, PROG3 can be multiplexed into a single transport stream. The field PID of each transport packet indicates one elementary stream to which that packet relates, these being interleaved in units of transport packets with plentiful other streams. One programme may for example comprise of a video stream (PID='055' in the example), an audio stream (PID='056') and teletext data stream (PID='057'). The correspondence between PID values and programmes, and the type of data carried with each PID is maintained in the form of programme specific information (PSI) tables. Periodically within the transport stream a programme association table PAT is carried in a special stream of transport packets with PID=0. The PAT in turn indicates for PROG1, PROG3 etc., which stream carries a programme mapping table PMT, which lists completely the different PID values relating to the single programme, and describes the content of each one (video, audio, alternative language audio, etc.). These tables and other data for control purposes are referred to herein as system information.

To reproduce or record a given programme (PROG1) from the transport stream, the payload DAT-0 to DAT-N of successive transport packets having that PID is concatenated into a stream, and this stream carries packetised elementary stream packets PES-PKT, which are further defined in the MPEG-2 specification. Each PES packet begins with a distinctive packet start code prefix PSCP. Next in the PES packet header is a stream identifier SID which identifies the type of elementary stream (for example video, audio, padding stream or private stream). PES packets do not have a fixed length unless specified in a particular application, and a PES packet length field LEN specifies the number of bytes in the PES packet. Various control and flag fields C&F then follow, including for example a data alignment indicator DAI and a header length field HLEN. Various optional fields are then present within the header HDAT, depending on the value of associated flags in the C&F field for example, a presentation time stamp PTS may be present specifying the time with reference to a system clock at which a "presentation unit" picture, audio frame etc.) beginning in the present PES packet is due to be presented. In certain cases, presentation units are decoded in a different order from their presentation order, in which case a decoding time stamp DTS may also be present.

The payload PY-0 to PY-N of successive PES packets having the same SID forms a continuous elementary stream of data shown schematically at ES in FIG. 7. In the case of a video elementary stream ES-VIDEO, various picture sequences or clips SEQ are present, each including at its start a sequence header SEQH. Various parameters of the decoder including quantisation matrices, buffer sizes and the like are specified in the sequence header. Accordingly, correct playback of the video stream can only be achieved by starting the decoder at the location of a sequence header. Within the data for each sequence are one or more "access units" of the video data, each corresponding to a picture (field or frame depending on the application). Each picture is preceded by a picture start code PSC. A group of pictures GOP may be preceded by a group start code GSC, all following a particular sequence header SEQH.

As is well known, pictures in MPEG-2 and other modern digital formats are encoded by reference to one and other so as to reduce temporal redundancy. Motion compensation provides an estimate of the content of one picture from the content already decoded for a neighbouring picture or pictures. Therefore a group of pictures GOP will typically comprise: an intra-coded "I" frame, which is coded without reference to other pictures; two or three "P" (predictive) coded pictures which are coded using motion vectors based on a preceding I frame; and bidirectional predicted "B" pictures, which are encoded by prediction from I and/or P frames before and after them in sequence. The amount of data required for a B picture is less than that required for a P picture, which in turn is less than that required for an I picture. On the other hand, since the P and B pictures are encoded only with reference to other pictures, it is only the I pictures which provide an actual entry point for starting playback of a given sequence. Furthermore, it will be noted that the GOP data, the I and P pictures are encoded before the corresponding B pictures, and then re-ordered after decoding so as to achieve the correct presentation order. Accordingly, B and P pictures are examples where the presentation time stamp PTS and decoding time stamp DTS may differ. Part of one group of pictures GOP is illustrated in FIG. 7 beneath the Video-ES.

Finally in FIG. 7 there is shown a representation of an audio elementary stream ES-AUDIO. This comprises simple frames of data FRM with frame start codes. Various audio formats are permitted, varying in terms of sample rate (32 kHz, 48 kHz etc.) and also data rate (for example 32 kbits/s per second, or variable). These and other properties of the audio and video streams are encoded in the programme specific information PSI, in the PES packet headers and in the frame headers.

Audio frames and video pictures having the same presentation time stamp PTS are those which are to be presented simultaneously at the output of the decoder. On the other hand, there is great freedom in the scheduling of packets of data from the different elementary streams, such that audio and video access units having the same PTS value can arrive in the transport stream TS up to one second apart.

System Target Decoders

In order to ensure that buffering and other aspects of a real decoder are able to decode each type of stream without breaks in the presented audio-visual programme, the MPEG-2 standard specifies a transport stream "system target decoder" (T-STD) model and a program stream system target decoder (P-STD) model. Broadly, each system target decoder is a model of a hypothetical real decoder having means for de-multiplexing the different elementary streams of the TS or PS format, having decoders for each of the audio, video and system control types of data, and having buffers between the incoming stream and the decoder for holding data of each elementary stream between its arrival from a data channel and its actual time of decoding and presentation.

T-STD and P-STD are both similar in general form, as explained more fully in the MPEG-2 specification. However, differences between the T-STD and the P-STD mean that, in general, a transport stream cannot be mapped directly to a program stream without re-scheduling at least at the level of PES packets, and similarly for conversation from PS to TS format. As one example, the audio decoder in TS format has a smaller buffer than in the P-STD. As another example, each main buffer in the T-STD is preceded by a transport buffer which acts to smooth the rather "bursty" data in the transport stream itself. While data for a given stream may arrive in a burst of several transport packets at a peak rate of 40 megabits per second, the average rate of such a stream, when taking into account the entire transport stream multiplex, is far lower. A "leak rate" is defined for the transport buffers so as to throttle the incoming data to rates of 2 Mbit/s (audio) and 18 Mbit/s (video), assuming that there is data to be passed into the main buffer.

Simple Editing

For simple edits nothing is done during editing to ensure that the stream will playback smoothly. In particular, no bridge sequence is generated and stored. Therefore, the device must deal with the problems at playback time. In general it is not possible to guarantee perfect playback but the proposed method aims to reduce the disturbance to the user as much as possible.

Potential problems that may arise by joining the two MPEG streams at arbitrary frame boundaries are:

1. Video May Not be Decodable

As explained above MPEG codes the majority of video frames with reference to other video frames. If data for a reference frame is missing then the dependent frames will not be decodable. If a frame is decoded using an incorrect reference frame, the result will be disturbing visual artefacts. Also, because of the re-ordering of video frames in the MPEG TS, it is possible that there will be video frames contained in the edited stream that should not be displayed.

A special case is where the entry and exit frames are chosen so they are all decodable. This may happen at random when the user has free selection of the exit and entry frames, but will not generally be the case. In an alternative embodiment, the user may be constrained to select only certain frames as exit and entry points.

2. Partial Audio Frames

Audio and video frames are split into Transport Stream packets of 188 bytes and these Transport Stream packets are interleaved in the Transport Stream multiplex. There is no alignment between the audio and video frame boundaries within the multiplex. Therefore, joining two streams at video frame boundaries will result in partial audio frames around the edit point. An attempt by the decoder to decode these partial audio frames will result in audio artefacts.

3. Buffer Problems

A major feature of the MPEG specification is to define parameters of the buffer capacity and behaviour of the decoder in a range of circumstances (see System Target Decoder above). A stream obtained by concatenating parts of two MPEG-compliant streams at an arbitrary point will not in general conform to the MPEG buffer model. On playback this may result in the decoder losing data through buffer over- or underflow, leading to audio and/or video artefacts.

4. Audio Skew

The audio frames that are presented with video frames are not aligned in the multiplex. Typically the audio that corresponds to the video comes later in the multiplex than the video. However, in general the audio can be up to one second before or one second after the corresponding video in the multiplex.

5. Time-base Discontinuity

The time-base used for the PCR/PTS/DTS timestamps will be discontinuous at the edit point. The correct offset between the two time-bases is given by the difference between (i) the PTS of the last frame of the first sequence plus one frame period, and (ii) the PTS of the first frame of the second sequence.

6. Continuity Counter Discontinuity

The Continuity Counter in the TS packets will be discontinuous at the edit point. This causes a decoder to suppress reproduction of each until a new sequence header is found.

The methods and apparatus to be described address these problems.

Creation of Simple Edits

For simple editing no changes are made to the streams during editing but some additional data ("meta data") should be stored as part of the playlist for the edited recording. In particular, pointers are stored identifying: (i) the point in the first stream where the last frame to be displayed ends and (ii) the point in the second stream where the first frame to be displayed starts. For example, for the first edit in the example of FIG. 5, these pointers would indicate points P2 and P3 respectively. These pointers can be stored either directly pointing to the logical address of the data, or by reference to a time value. In the latter case the time pointers can be translated into addresses by reference to a look-up table of Characteristic Point Information or CPI. CPI is a form of index for at least a section of the stored programme, identifying (say) the location of each picture sequence start within the bit-stream.

Also stored is (iii) the offset in presentation time between the two time-bases, given by PTS of last frame of first stream minus PTS of first frame of second stream. Note that playback will be simpler if the offset is stored after making the adjustments proposed in steps 1 to 4 described in the following section. However it is also possible to have an embodiment where the offset is stored without adjustment, and the adjustments made as necessary on playback. This requires reading and parsing data on playback.

Playback of Simple Edits via Digital Interface

Reproducing the edited stream via a built-in decoder, any degree of sophisticated handling is possible in principle. However, to enable playback of simple edits on a standard STB without any disturbing artefacts, the following procedure is implemented by the apparatus of FIG. 1. This includes steps to be performed on playback, and also steps performed in creating the additional data defining the edit.

1. Only Send Decodable Audio/Video to the STB.

The pointers in the meta-data for the edit are selected to ensure that the first stream will always end before a P- or I-frame (in bit-stream, as opposed to presentation order), while the second stream will always start with an I-frame. Only complete audio frames are sent to the decoder. A gap in audio presentation should be left at the edit point. Unwanted audio packets are removed from the stream by changing the PID of each packet to 0x1FFF indicating a NULL packet. This will not cause a problem with the Continuity Counters because packets will only be deleted immediately before or immediately after the Continuity Counter discontinuity.

2. Ensure no Buffer Overflow.

To ensure that no buffer overflow occurs, the buffer status at the edit point should be calculated. The following algorithm is used, while others are equally possible:

(a) Calculate the buffer fullness $D_{buff}$ in the original second stream at the edit point. This can be easily calculated by adding the size of all video frames that precede the edit point but have DTS time after the time of the edit point.

(b) Calculate the buffer fullness $S_{buff}$ of the first stream at the edit point. This can be calculated in a similar way to point 1.

(c) If $S_{buff} > D_{buff}$ then add a frame period to the offset between the streams and adjust the value of $S_{buff}$ to the buffer fullness one frame period later than before.

(d) Repeat point 3 until $S_{buff} < D_{buff}$.

This will ensure that there is no buffer overflow. An alternative approach for Steps (c) and (d) above would be to keep the offset constant in Step (c) but move the edit point in the first stream to exclude the last frame. In practice more than one frame may need to be removed to ensure that the first stream always ends before a P/I frame. In either case the result on playback will be that the last frame from the first stream will be frozen on the display for more than one frames period. Both approaches can be used in combination, which might mitigate the adverse effects each has for user satisfaction.

If editing is done at GOP boundaries, in most cases the buffer fullness at the end of the first stream and the start of the second stream will be similar. Therefore by choosing to edit only at GOP boundaries we can in general reduce the amount by which the offset between the stream is increased and hence reduce the time that a freeze frame appears during playback of the edited sequence. The designer of the apparatus may for this reason decide that only GOP boundaries can be selected by the user. In general, however, the user may have a free choice of edit points, with or without advice from the apparatus as to which are the best choices.

3. Ensure No Buffer Underflow

The offset between the two streams is calculated initially from the PTS values and adjusted as described above. The time at which the second stream starts loading is calculated in terms of the first time-base, using the offset, the first PCR timestamp in the second stream and the multiplex rate. If the time implied for the second stream to start loading is before the end of the first stream then there is a potential problem because this cannot happen. The result is that the second stream will begin loading later than the time implied in the multiplex, and this may result in buffer underflow (where data for a frame has not been fully loaded at its decode time). To solve this problem, the offset between the two streams is simply increased by a multiple of the frame period until there is no overlap in loading times of the two streams, before recording it in the additional data for the edit.

4. Update Timestamps PCR/PTS/DTS

On playback, the device updates all timestamps after the edit point so the decoder sees a continuous stream. The offset to use for updating the timestamps is given by the difference between the PTS of the first frame after the edit point and the last frame before the edit point, adjusted if necessary in the various steps above. Because not all frames are being displayed, there will be a gap in presentation time for both audio and video. The decoder should freeze the video and mute the audio (see MPEG-2 Conformance Specification, ISO/IEC 13818-4:1995, Section 2.3.3.1.1). If the timestamps were not updated, then the decoder would assume that the audio and video are continuous. This may result in buffer overflow and the loss of data.

5. Set Discontinuity Indicator at Continuity Counter Discontinuity

A Video Sequence Header is normally sent at the start of a GOP so, from Point 1 above, the first byte in the video Elementary Stream after the edit will be a Video Sequence Header. Similarly, the first audio packet should contain the start of an audio frame. On playback, the apparatus sets the Discontinuity Indicator bit in these packets.

It is not mandatory for a sequence header to be present at the start of a GOP. However if there is no sequence header there may be problems decoding the video stream because the decoder will not know the quantisation matrix needed to decode the stream. In broadcast streams a similar problem occurs when changing channels and for this reason broadcasters typically include a sequence header at small time intervals in the stream. Therefore when choosing the point to edit in the second stream, instead of choosing the next convenient I-frame, the apparatus can choose the next I-frame that is preceded by a sequence header.

The field sequence (top-bottom) need not be preserved across edit points, however, if the field sequence is not preserved then the offset between the two streams should be an odd number of field periods. This includes the case of 3:2 pull-down. Resolution changes and mixed frame rates (e.g. from NTSC and PAL) may result in disturbing artefacts and so should be avoided.

Figure 8:
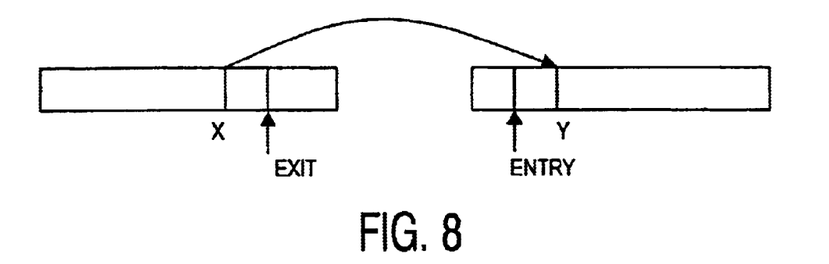
FIG. 8 illustrates a simple (non-seamless) edit operation.

Although simple edits are created frame accurate, over a digital interface they are played back GOP accurate. FIG. 8 shows an example. The fact that the edit is created frame accurate leaves the possibility for more sophisticated treatment during playback by another apparatus, for example using a built-in decoder. The over-riding requirement for reproduction via a standard interface and decoder is thus met without preventing better performance where the implementation allows.

In view of the above considerations, the following actions are performed by the apparatus to play back the simple edit over the digital interface 1 (FIG. 1):

A1. The first stream is played back until point X, which is the end of the previous GOP. In the recording system contemplated herein, such points can be found from Characteristic Point Information CPI which is stored automatically in the playlist data for the disk. Our copending application PCT/EP99/08252 (PHN 17161), not published at the priorty date of the present application, describes possible applications and formats for CPI. In principle, the same information can be found by parsing sufficient of the stream until sequence headers are found.

A2. Transport packets up to point X are transmitted according to their arrival timestamps. At the end of the first stream, a transport stream packet with a Discontinuity Information Table (DIT) is inserted. DIT is Part of DVB standard system information, rather than MPEG itself.

Basically, DIT specifies where a discontinuity is found in a partial transport stream.

More detail can be found in the ETSI document EN 300 468 "Digital Video Broadcasting (DVB); Specification of Service Information (SI) for DVB streams".

A3. At the end of the first stream, Transport packets are inserted with the Program Allocation Table PAT for the second stream and Transport packets are inserted with a PMT for the second stream. These packets also have the discontinuity indicator set in the adaptation field AF, to avoid that the decoder will discard them as erroneous.

A4. By parsing the end of the first stream up to point X, the DTS of the last picture and the STC (PCR) at point X can be determined. After point X and the inserted Transport packets for PAT/PMT, transmission of packets could be suspended until the STC value is greater than the DTS of the last frame. Alternatively a delay of 1 second could be used (the maximum permitted for the delay). Using the stored offset information, however, the present apparatus is able to minimise the gap before presentation of new frames. In particular, looking into the second stream from the entry point onwards, the player will find PCR values under a new time-base. The stored offset can be added to the STC running during the first stream, to obtain a current time value in terms of the new time-base. When this matches the PCR encoded at the entry point of the second sequence, transmission of packets can continue. It is noted that not all entry points will have PCR conveniently encoded in the immediate vicinity. However, it is possible for the apparatus to read ahead or behind the edit point and infer the desired STC (under new time-base) in between PCR codes, or simply wait until the next PCR arrives. There is a maximum 0.1 seconds gap permitted between one PCR and the next, with a recommendation to repeat at least every 0.04 second. Accordingly, even if the new time values are not available instantaneously, it still will usually still be possible to resume feeding packets safely far sooner than the "safe" 1-second delay suggested otherwise.

A5. During parsing of the stream up to point X, it is easy to know when the last video frame begins. During parsing of the data multiplexed with the last video frame, once the start of a new audio frame is found, this audio packet and all subsequent audio packets of the same PID will have their PIDs changed to 0x1FFF (Null packet). This is to avoid the case where partial audio frames are sent to the decoder. This should be done for all audio PIDs. Because audio frames are not aligned with Transport packets, it may be necessary to stuff part of the last audio packet to remove the start of the next audio frame. Stuffing can be done by either adding a PES stuffing packet or by adding an adaptation field. The adaptation field allows any desired number of data bytes to be added to the PES packet, as described in the MPEG specification. The data can be meaningless for stuffing purposes.

A6. The second stream begins playing at point Y, which is the start of the GOP after the in point (found from CPI stored with the playlist). The second stream should begin playing after the delay defined in step A4 above and after that the Transport packets are transmitted according to their arrival timestamps, with a corresponding offset.

A7. Each elementary stream has its own PID. For the video PID, a Transport packet with discontinuity indicator set to 1 and a PES packet with stream_id 0xBE (padding stream) are inserted with continuity counter set to one less than the first video packet.

A8. Audio with PTS before the first video PTS ("leading audio") is discarded.

A9. For each audio PID, all packets should be deleted until the start of the next audio frame. If the first remaining audio Transport packet has an adaptation field then the discontinuity indicator should be set to 1. Again it may be necessary to stuff the first audio packet to remove the end of a previous audio frame.

A10. If there is a dedicated PCR PID then the discontinuity indicator should be set in the first packet with a PCR. If the PCR PID is also shared with audio or video then it is not convenient in general to set the discontinuity indicator because this indicator is in the adaptation field. To insert an adaptation field changes the payload of the packet, requiring that we repacketise and re-time the rest of the stream. This particularly so because, once the indicator is set it must be set in all packets until the PCR. The STB behaviour if this is not done is not defined in the MPEG specification.

Complex Editing for Seamless Playback

Complex Edits—Creation

For the more complex editing case, a bridge sequence is created as described above with reference to FIG. 6. However, the novel methods and apparatus described here apply the following additional constraints:

1. There should be a small gap in audio presentation (<1 frame period) and not an overlap. This is to avoid confusing the standard decoder when forwarding the audio stream over a digital interface. By contrast, it is proposed in WO-A-00/00981 (PHB 34262) that a positive overlap of between zero and one frames should be provided. Both approaches have merit. One advantage of the overlap is that a built-in decoder can then treat the audio edit with greater sophistication than the standard decoder, if desired, for example by a cross-fade from one stream to the other. However, the apparatus then should suppress one or other part of overlap, when playing to a standard decoder (STB) over the digital interface.

2. Two alternate cases apply for the handling of audio. In the first, audio should be remultiplexed to meet the MPEG-2 buffer constraints, implying that some audio from the first stream will be multiplexed with the video of the second stream. The PTS/DTS values for audio frames from the first stream that come after the edit point must be altered by an appropriate offset to refer to the time-base of the second stream. The audio buffer model in the transport stream System Target Decoder model (T-STD) differs from the audio buffer model for Program Streams (P-STD). During bridge creation it must be ensured that the remultiplexed stream satisfies the T-STD.

In the second case, there is no mixing with a clean break being maintained between the first and second data streams. On playback of such an edited sequence over a digital interface, some of the audio must be discarded to avoid buffer problems in the STB, as described in detail hereinafter.

3. When the bridge is created, the Continuity Counter CC at the beginning should be made consistent with the preceding stream.

4. Concerning the Continuity Counter (CC) at the end of the bridge sequence, this must be attended to somehow to avoid the edited stream being discarded at erroneous. Note that the CC values of the bridge sequence can be freely set during composition of the bridge sequence, but the CC values of the stored sequences either side of the bridge are regarded as fixed.

In a first embodiment, the continuity counter for each stream is set to increment steadily throughout the bridge sequence, and continuity is provided across the editing point in particular. Only by chance will the number of packets in each stream of the bridge sequence be exactly the number required to avoid discontinuity in the continuity count at some point in the edited stream.

Accordingly, at the end of the bridge sequence, the Continuity Counter is made consistent with the rest of the stream, by inserting empty PES packets (PES header but no data). It is not guaranteed that the point where the player jumps back to the second stream is the start of a PES packet for both audio and video, and it would spoil the payload and packet structure to insert padding packets in the middle of a "real" PES packet. Therefore the CC padding in each elementary stream is done at an appropriate point before the end of the bridge sequence, so that the new packets are inserted before a new PES header for both the audio and video. Provided account is taken of the last number of packets in the bridge, the final counter value in the bridge sequence can thus be made consistent with the stream that follows. In this context, it is sufficient if only the "core" of the bridge sequence is considered, excluding those packets which are merely copied to meet the allocation rules.

It is noted that MPEG defines null packets for padding of Transport Streams. However, these are useless for the CC padding purpose within the bridge sequence, because they are ignored by the continuity counting function in the decoder. The null packets may be inserted or deleted by re-multiplexing processes and, therefore, the delivery of the payload of null packets to the decoder cannot be assumed. The inventors have recognised that CC padding can be achieved, provided that a PES packet is included in each padding packet. The MPEG decoder will not increment the continuity counter for a packet without payload. For the purpose of CC padding, therefore, the present apparatus uses a genuine transport packet with a complete, but empty, PES packet within.

Different formats are possible for such empty packets. A preferred example is illustrated in Appendix A hereto, using the standard MPEG syntax. Although MPEG permits stuffing in an audio/video ES packet header, this option is not suitable, because a maximum of 32 stuffing bytes are permitted. In the example of Appendix A, stuffing is performed using an additional elementary stream (stream_id= padding_stream ID 0xBE), not used for real payload (refer to SID in FIG. 7 and ISO/IEC 13818-2 Section 2.4.3.7) Appendix B illustrates an alternative in which stuffing is implemented in the adaptation field of an active audio or video ES. Appendix C illustrates another alternative, with stuffing in the adaptation field of a dedicated padding stream.

Complex Edits—Illustrative Example

Figure 9:
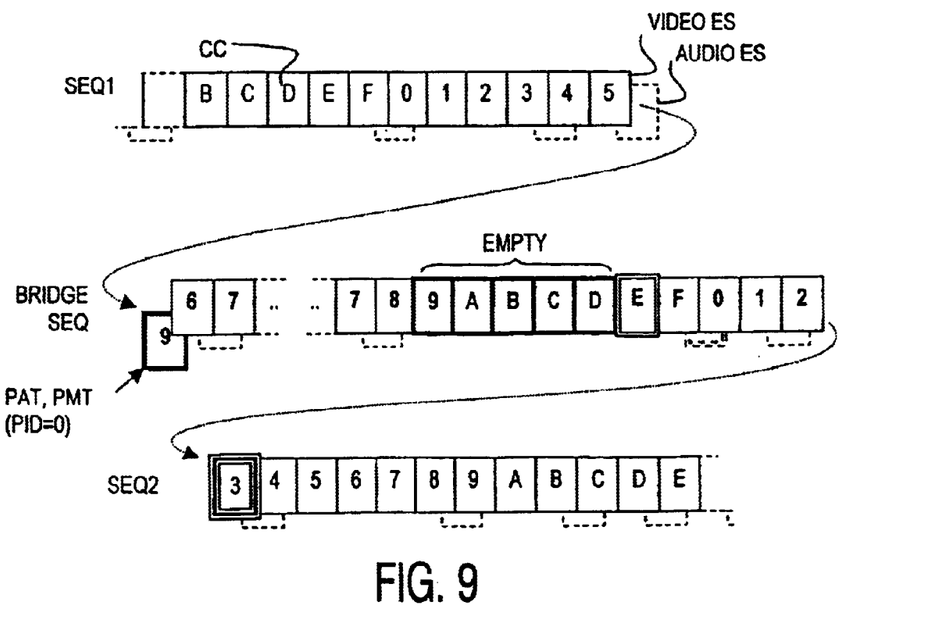
FIG. 9 illustrates the modification of data in a bridge sequence, in a complex (seamless) editing operation.

FIG. 9 illustrates the modifications made to the bridge sequence in the present embodiment, as a consequence of the steps described above. The data copied for compliance with the allocation rules (hatched in FIG. 6) is omitted, for simplicity. As explained above, each elementary stream (each PID) needs separate treatment: TS packets for an audio stream are shown in broken lines behind packets for the video. Needless to say, the real bridge sequence will typically contain thousands of 188-byte packets, although only a few are shown to illustrate the key features of the present process. Similarly, the ratio of video to audio packets is generally much lower than would be suggested by the diagram, approximately 12:1 in practice.

In the video stream, for the sake of illustration, a packet near the end of the bridge sequence is double-outlined in the drawing, where the apparatus has found the last PES header before the entry point to the second stream SEQ2. The four-bit CC values are indicated by the hexadecimal digit ('0' to '9', 'A' to 'F') in each packet, which increase by one with each packet sent in a given PID. Bold packets are those empty packets which have been inserted in the video stream by the editing process. Other packets in the bridge sequence are recoded and/or remultiplexed. Their CC values are shown bold. The first packet in SEQ2 is triple-outlined to indicate that a video sequence header here provides a valid entry point into the second stream.

Following the sequence of Continuity Counter values from the first stream onwards, we see that the video ES within first stream SEQ1 ends (for the purpose of jumping to the recoded portion of the bridge sequence) with a packet having CC=5. The first packet of video ES data within the bridge therefore has CC set to 6 during construction of the bridge sequence, thus providing continuity across the exit point from the first stream SEQ1, and the values of CC continue 7, 8 etc. from that point, through the edit point (not shown) and toward the end of the bridge sequence.

At some point, it is necessary to store new PMT, PAT and PCR values, associated with the edit point. In this embodiment, the first packet of the bridge, shown bold, is a packet with PID=0 inserted to convey PAT, PMT and other codes. These are sent with the field current_next_indicator saying "next", to indicate that they are preparatory for the sequence after the edit point. The sequence of CC values for the stream with PID=0 is independent of the sequences for the video and audio streams. For the sake of example, the inserted packet with PAT/PMT is shown with CC=9, on the basis that the last TS packet with PID=0 in the first stream SEQ1 had CC=8.

Returning to the video ES as the main example, the first packet in the second stream SEQ2 as stored on disc has CC=3 and this is not to be changed. After re-coding and re-multiplexing the core of the bridge sequence, with continuity from the exit point of the first stream SEQ1, it is found that the last CC value in the bridge would be 'D', which is five short of the required value for continuity upon joining the second stream. Accordingly, the editing apparatus in this example has inserted five empty packets, during the last part of the bridge so as to be continuous with the second stream (SEQ2). Counting backwards from the end of the bridge sequence, CC=2, 1, 0, etc., the packet shown in double outline with CC=E is found to coincide with last TS packet for the video ES having a PES header. The apparatus inserts its five extra empty packets immediately before this, with CC=9, A, B, C and D, thereby establishing CC continuity throughout the edit.

A different number of empty packets will be appropriate in each of the Audio and system information streams, and the location of the last PES header within the bridge may be different from that of the video stream. For simplicity, the insertion of packets is illustrated in FIG. 9 for the video ES only.

It will be appreciated that there will never be a need to insert more than fifteen empty packets in each stream, because the four-bit value rolls over. Similarly, approximately one time in sixteen, no empty packets need be inserted, because CC is continuous across the edit by a matter of chance. It will further be apparent that the inserted packets need not be bunched at the last possible point as shown, but could be at an earlier point, and could be spread over a larger interval if preferred.

The discontinuity indicator need only be set where the time-base changes, which could in principle be anywhere in the bridge sequence, but is easiest implemented at the desired edit point, somewhere in the middle of the bridge sequence.

In a variation of the above technique, a Continuity Counter discontinuity can be left at the edit point (within the bridge), but with the discontinuity indicator bit set in the packets where the Continuity Counter discontinuity occurs. Recall that the discontinuity state according to MPEG persists until a new sequence header is found. Normally after the edit point there will be a video sequence header and the start of a new audio frame, so that the discontinuity state will have no effect on the playback. To employ this variation will still require working backward from the end of the bridge to make the Continuity Counters consistent at the end of the bridge.

Playback of Complex Edit via Digital Interface

Since the edit and bridge sequence are constructed to be seamlessly MPEG-2 compliant, there is little processing work for the player. The only problem is that there is a time-base discontinuity (in PCR timestamps) and extra audio.

On playback the PCR discontinuity is removed from the stream by:

C1. Setting discontinuity indicator in PCR packet to 0; and
C2. Updating all PCR/DTS/PTS values by the offset between the last PTS before the edit point and the first PTS after the edit points.

For subsequent edit points the new offset must be added to the previous offset and the combined value used.

As an alternative, if the PCR discontinuity were not removed, Transport packets with a DIT table can be inserted at the edit point.

To avoid problems with the audio buffer model, it may be necessary to delete some audio packets. After the end of the last video frame in the first stream SEQ1, once the start of a new audio frame is found, that packet and all subsequent audio packets should be deleted before sending over the digital interface. Conventional null TS packets can be inserted in their place, to preserve the TS format. Leading audio (i.e. audio that precedes the first video packet) is deleted similarly to avoid problems with audio buffer overflow.

Alternative Embodiments

As will be generally understood, the preceding examples relate to frame-based rather than field-based editing: this is because the general unit of video encoding in MPEG is the frame. It will be recognised by the skilled person that MPEG compliance is not mandatory (as mentioned above) and that the techniques described herein may be also applied to non-MPEG field-based data.

Referring to the treatment of the Continuity Counter in the packets of the bridge sequence at Point 4 above, alternative strategies are envisaged, which may satisfy requirements for seamless editing. The techniques described above are preferred, however, for the reason that special treatment at playback time is minimal. One such alternative, is to make no correction to the Continuity Counter during bridge creation. During playback the Continuity Counter is made continuous across the edit points, by inserting extra packets into each PID stream as discussed above.

APPENDIX A

Empty Packet - Option 1 Padding ES

| Syntax | Value | No. of bits |
|---|---|---|
| Transport_packet(){ | | |
| Sync_byte=; | 0x47 | 8 |
| Transport_error_indicator | 0x0 | 1 |

APPENDIX A-continued

Empty Packet - Option 1 Padding ES

| Syntax | Value | No. of bits |
|---|---|---|
| Payload_unit_start_indicator | 0x1 | 1 |
| Transport_priority | 0x0 | 1 |
| PID | PID | 13 |
| Transport_scambling_control | 0x0 | 2 |
| Adaptation_field_control | 0x3 | 2 |
| Continuity_counter=(next one)-1; | N-1 | 4 |
| Adaptation_field(){ | | |
|   Adaptation_field_length | 0x1 | 8 |
|   Discontinuity_indicator | 0x1 | 1 |
|   Random_access_indicator | 0x0 | 1 |
|   Elementary_stream_priority_indicator | 0x0 | 1 |
|   PCR_flag | 0x0 | 1 |
|   OPCR_flag | 0x0 | 1 |
|   Splicing_point_flag | 0x0 | 1 |
|   Transport_private_data_flag | 0x0 | 1 |
|   Adaptation_fiel_extension_flag | 0x0 | 1 |
| } | | |
| payload(){ | | |
|   packet_start_code_prefix | 0x1 | 24 |
|   stream_id = padding stream | 0xBE | 8 |
|   PES_packet_length | 0xB0 | 16 |
|   For(I=0;i<N;I++){ | | |
|     Stuffing_byte | 0xFF | 8 |
|   } | | |
| } | | |
| } | | |

APPENDIX B

Empty Packet - Option 2 Stuffing in adaptation field audio/video ES

| Syntax | Value | No. of bits |
|---|---|---|
| Transport_packet(){ | | |
| Sync_byte=; | 0x47 | 8 |
| Transport_error_indicator | 0x0 | 1 |
| Payload_unit_start_indicator | 0x1 | 1 |
| Transport_priority | 0x0 | 1 |
| PID | PID | 13 |
| Transport_scambling_control | 0x0 | 2 |
| Adaptation_field_control | 0x3 | 2 |
| Continuity_counter=(next one)-1; | N-1 | 4 |
| Adaptation_field(){ | | |
|   Adaptation_field_length | Length | 8 |
|   Discontinuity_indicator | 0x1 | 1 |
|   Random_access_indicator | 0x0 | 1 |
|   Elementary_stream_priority_indicator | 0x0 | 1 |
|   PCR_flag | 0x0 | 1 |
|   OPCR_flag | 0x0 | 1 |
|   Splicing_point_flag | 0x0 | 1 |
|   Transport_private_data_flag | 0x0 | 1 |
|   Adaptation_field_extension_flag | 0x0 | 1 |
| } | | |
| payload(){ | | |
|   packet_start_code_prefix | 0x1 | 24 |
|   stream_id (=video or audio elementary stream) | 0xE0 | 8 |
|   PES_packet_length | Length | 16 |
|   '10' | 0x2 | 2 |
|    | 0x0 | 2 |
|   PES_scrambling_control | 0x0 | 1 |
|   PES_priority | 0x1 | 1 |
|   Data_alignment_indicator | 0x0 | 1 |
|   Copyright | 0x1 | 1 |
|   Original_or_copy | 0x0 | 2 |
|   PTS_DTS_flag | 0x1 | 1 |
|   ESCR_flag | 0x0 | 1 |
|   ES_rate_flag | 0x0 | 1 |
|   DSM_trick_mode_flag | 0x0 | 1 |
|   Additional_copy_info_flag | 0x0 | 1 |
|   PES_CRC_flag | 0x0 | 1 |
|   PES_extension_flag | Length | 8 |
|   PES_header_data_length | | |

APPENDIX B-continued

Empty Packet - Option 2 Stuffing in adaptation field audio/video ES

| Syntax | Value | No. of bits |
|---|---|---|
| For(I=0;I<N;I++){ | 0xFF | 8 |
|   Stuffing_byte | | |
|   } | | |
| } | | |
| } | | |

APPENDIX C

Empty Packet - Option 3 Padding in adaptation field with padding ES

| Syntax | Value | No. of bits |
|---|---|---|
| Transport_packet(){ | | |
|   Sync_byte=; | 0x47 | 8 |
|   Transport_error_indicator | 0x0 | 1 |
|   Payload_unit_start_indicator | 0x1 | 1 |
|   Transport_priority | 0x0 | 1 |
|   PID | PID | 13 |
|   Transport_scambling_control | 0x0 | 2 |
|   Adaptation_field_control | 0x3 | 2 |
|   Continuity_counter=(next one)-1; | N-1 | 4 |
|   Adaptation_field(){ | | |
|     Adaptation_field_length | Length | 8 |
|     Discontinuity_indicator | 0x1 | 1 |
|     Random_access_indicator | 0x0 | 1 |
|     Elementary_stream_priority_indicator | 0x0 | 1 |
|     PCR_flag | 0x0 | 1 |
|     OPCR_flag | 0x0 | 1 |
|     Splicing_point_flag | 0x0 | 1 |
|     Transport_private_data_flag | 0x0 | 1 |
|     Adaptation_fiel_extension_flag | 0x0 | 1 |
|     Padding Byte | 0xFF | 8 |
|   } | | |
|   payload(){ | | |
|     packet_start_code_prefix | 0x1 | 24 |
|     stream_id = padding stream | 0xBE | 8 |
|     PES_packet_length | Length | 16 |
|     For(I=0;I<N;I++){ | | |
|       Stuffing_byte | 0xFF | 8 |
|     } | | |
|   } | | |
| } | | |

What is claimed is:

1. Apparatus comprising means operable to read sequences of data from a storage device and to edit the same such that a first edit point in a first sequence is linked to a second edit point in a second sequence without violating constraints imposed by a predefined decoder, wherein each of the stored sequences comprises at least one series of transport packets, the transport packets of a given series including respective continuity counter values each related by predetermined continuity rules to the preceding one, the apparatus comprising means for calculating the magnitude of a discontinuity in continuity counter values resulting from the linking of said edit points, and means for generating a number of additional transport packets, the number corresponding to the discontinuity, each having its own continuity counter value, so as to define an edited sequence of transport packets linking said first and second edit points while complying with said constraints and continuity rules.

2. Apparatus as claimed in claim 1, wherein at least said firet sequence conveys at least one packetized elementary stream whose packets have themselves been subdivided to form said transport packets.

3. Apparatus as claimed in claim 2, wherein the apparatus is adapted to identify a transport packet whose payload includes a packet boundary, and to generate said additional packet(s) so as to comply with said continuity rules when inserted before the identified packet.

4. Apparatus as claimed in claim 1, comprising means for outputting said edited sequence of transport packers, including said additional packets, via a digital interface.

5. Apparatus as claimed in claim 1, wherein the first and second sequences of data each comprise a multiplex of plural packetized elementary streams, each elementary stream having its own sequence of transport packets.

6. Apparatus as claimed in claim 5, wherein the continuity rules operate independently for each elementary stream, the apparatus being adapted to generate additional transport packets for each elementary stream in accordance with the magnitude of discontinuity calculated for that stream individually.

7. Apparatus as claimed in claim 1 wherein the apparatus comprises means for generating and storing in advance of reproduction additional data defining the edit.

8. Apparatus am claimed in claim 1, wherein said first and second sequences comprise frame-based data including a number of frames which are intra-coded without reference to any other frame of the sequence, and a number of frames which are inter-coded with reference to at least one further frame of the sequence.

9. Apparatus as claimed in claim 8, wherein the apparatus includes bridge generation means configured to create a bridge sequence of transport packets to link the first and second sequences around said edit points, by selective incorporation of frames from the stored first and second frame sequences and selective re-coding of one or more of the frames within the bridge sequence as determined by the coding type (intra- or inter-) of the frames from the first and second sequences indicated by the respective edit points.

10. Apparatus as claimed in claim 9 wherein said continuity rules permit a discontinuity in the edited sequence, at a location followed immediately by certain classes of frame header, and the apparatus is adapted to include such a discontinuity in the bridge sequence, while inserting said additional packets so as to ensure compliance with the continuity rules prior to entering the stored second sequence.

11. Apparatus as claimed in claim 1, comprising means for storing the bridge sequence on a record carrier together with said first and second sequences and playlist information.

12. A method of reading sequences of data from a storage device and editing the same such that a first edit point in a first sequence is linked to a second edit point in a second sequence without violating constraints imposed by a predefined decoder, wherein each of the stored sequences comprises at least one series of transport packets, the transport packets of a given series including respective continuity counter values each related by a predetermined continuity rules to the preceding one, the method comprising calculating the magnitude of a discontinuity in continuity counter values resulting from the linking of said edit points, and generating a number of additional transport packets, the number corresponding to the discontinuity, each having its own continuity counter value, so as to define an edited sequence of transport packets linking said first and second edit points while complying with said constraints and continuity rules.

13. A method of reading sequences of data from a storage device and editing the same as claimed in claim 12 wherein at least said first sequence conveys at least one packetized elementary stream whose packets have themselves been subdivided to form said transport packets.

14. A method of reading sequences of data from a storage device and editing the same as claimed in claim 13, wherein the apparatus is adapted to identify a transport packet whose payload includes a packet boundary, and to generate said additional packet(s) so as to comply with said continuity rules when inserted before the identified packet.

15. A method of reading sequences of data from a storage device and editing the same as claimed in claims 12, wherein the first and second sequences of data each comprise a multiplex of plural packetized elementary streams, each elementary stream having its own sequence of transport packets.

16. A method of reading sequences of data from a storage device and editing the same as claimed in claim 15, wherein the continuity rules operate independently for each elementary stream, and the additional transport packets are generated for each elementary stream in accordance with the magnitude of discontinuity calculated for that stream individually.

17. A method of reading sequences of data from a storage device and editing the same as claimed in claim 12 wherein additional data defining the edit are generated and stored in advance of reproduction.

18. A method of reading sequences of data from a storage device and editing the same as claimed in claim 12 wherein said first and second sequences comprise frame-based data including a number of frames which are intra-coded without reference to any other frame of the sequence, and a number of frames which are inter-coded with reference to at least one further frame of the sequence.

19. A method of reading sequences of data from a storage device and editing the same as claimed in claim 18, including creating a bridge sequence of transport packets to link the first and second sequences around said edit points, by selective incorporation of frames from the stored first and second frame sequences and selective re-coding of one or more of the frames within the bridge sequence as determined by the coding type (intra- or inter-) of the frames from the first and second sequences indicated by the respective edit points.

20. A method of reading sequences of data from a storage device and editing the same as claimed in claim 19 wherein said continuity rules permit a discontinuity in the edited sequence, at a location followed immediately by certain classes of frame header, and such a discontinuity is included in the bridge sequence, while inserting said additional packets so as to ensure compliance with the continuity rules prior to entering the stored second sequence.

21. A method of reading sequences of data from a storage device and editing the same as claimed in claim 12 comprising storing the bridge sequence on a record carrier together with said first and second sequences and playlist information.

22. A recording carrying first and second frame data sequences together with one or more bridge sequences whereby a first edit point in a first frame sequence is linked to a second edit point in a second frame sequence, said bridging sequence having been generated by a method as claimed in claim 19.

23. Data reproducing apparatus comprising reproducing means operable in response to stored edit data to read from a storage device first and second sequences of data, the edit data linking a first edit point in the first sequence to a second edit point in a second sequence so as to output a desired edited sequence, wherein said first and second sequences each comprise at least two multiplexed elementary streams encoded and multiplexed in a form compliant with a predefined decoder specification such that truncating said first sequence at said first edit point and entering said second sequence at said second edit point would potentially violate one or more constraints within said decoder specification, said reproducing means operating substantially without recoding or re-multiplexing of said elementary streams by reproducing data selectively from said first and second sequences in the vicinity of said edit points, such that said edited sequence, as output, complies with said decoder specification.

24. Apparatus as claimed in claim 23, wherein at least one of said elementary streams in the first sequence comprises frame-based data in which a number of frames (hereinafter "I frames") are intra coded, without reference to any other frame of the sequence, a number (hereinafter P frames") are respectively coded with reference to one further frame of the sequence, and the remainder (hereinafter B-frames") are respectively coded with reference to two or more further frames of the sequence, and wherein said reproducing means includes means for identifying an exit point by reference to the location of said first edit point and to the coding type of frames in the vicinity indicated by said first edit point, and suppressing reproduction of frames of the first sequence after said exit point.

25. Apparatus as claimed in claim 24, wherein said exit point is chosen as the a frame boundary in the data stream prior to the first edit point and immediately prior to an I- or P-frame, in terms of stream order as opposed to presentation order.

26. Apparatus as claimed in claim 24, wherein said exit point is identified using characteristic point information stored separately from the stream data.

27. Apparatus as claimed in claim 24, wherein said at least one elementary stream comprises video frame data, and a further elementary stream within each of said first and second sequences comprises audio frame data, said reproducing means being arranged to use presentation time information within the elementary streams to suppress output of any audio frame data having a presentation time later than the presentation time of the video frame at said exit point.

28. Apparatus as claimed in claim 23, wherein at least one of said elementary streams in the second sequence comprises frame-based data in which a number of frames (hereinafter "I frames") are intra coded, without reference to any other frame of the sequence, a number (hereinafter P frames") are respectively coded with reference to one further frame of the sequence, and the remainder (hereinafter B-frames") are respectively coded with reference to two or more further frames of the sequence, and where said reproducing means includes means for identifying an entry point by reference to the location of the second edit point and to the coding type of frames in the vicinity indicated by said second edit point, and suppressing reproduction of frames of the second sequence prior to said entry point.

29. Apparatus as claimed in claim 24, wherein said entry point is identified using characteristic point information stored separately from the stream data.

30. Apparatus as claimed in claim 24, wherein said at least one elementary stream comprises video frame data, and a further elementary stream within each of said first and second sequences comprises audio frame data, said reproducing means being arranged to use presentation time information within the elementary streams to suppress reproduction of any audio frame having a presentation time earlier than the presentation time of the video frame at said entry point.

31. Apparatus as claimed in claim 27, wherein said suppression of said audio frames is implemented by modifying codes within packets of audio data, rather than removing them from the multiplex.

32. Apparatus as claimed in claim 31 wherein audio data is suppressed so as to promote a gap in availability of audio data in preference to an overlap of audio data from the first and second sequences.

33. Apparatus as claimed in claim 23 comprising means for calculating an offset between time-bases of the first and second sequences in accordance with encoded presentation time values and frame update rate.

34. Apparatus according to claim 33 wherein said reproducing means is arranged to calculate relative buffer fullness between the exit point of the first sequence and the entry point in the second sequence, in its original form, and to delay entry into the second sequence if necessary to prevent buffer overflow in accordance with buffer constraints of said decoder specification.

35. Apparatus according to claim 34 wherein said reproducing means is arranged to implement said delay by increasing the calculated offset between time-bases iteratively, until the relative buffer fullness satisfies a compatibility criterion, and then to use the increased offset to generate the edited sequence.

36. Apparatus according to claim 33, wherein said reproducing means is arranged iteratively to calculate relative buffer fullness between the exit point of the first sequence and the entry point in the second sequence, in its original form, and to modify at least one of the entry and exit points until the relative buffer fullness satisfies a compatibility criterion, and then to use the modified entry and exit point, if any, for generating the edited sequence.

37. Apparatus as claimed in claim 33, wherein said reproducing means is further arranged to calculate of loading times for data of the first and second sequence, using encoded decode time stamps and the calculated offset between time-bases, to identify instances of overlapping load times as to prevent buffer underflow, and to modify said offset in the event that said calculations imply a loading time for data of the second sequence prior to completion of loading data of the first sequence.

38. A method of reproducing stored data, wherein first and second sequences of data stored are read from a storage device and reproduced, in accordance with pre-stored edit data linking a first edit point in the first sequence to a second edit point in a second sequence, so as to output a desired edited sequence, wherein said first and second sequences each comprise at least two multiplexed elementary streams encoded and multiplexed in a form compliant with a pre-defined decoder specification such that truncating said first sequence at said first edit point and entering said second sequence at said second edit point would in general violate one or more constraints within said decoder specification, said reproducing being substantially without recoding or re-multiplexing of said elementary streams by reproducing data selectively from said first and second sequences in the vicinity of said edit points, such that said edited sequence, as output, complies with said decoder specification.

39. A signal for reproducing an edited data sequence and produced by a method as claimed in claim 38.

* * * * *